Jan. 31, 1956   J. A. ANDERLE   2,732,881
HOT WIRE CUTTER
Filed March 18, 1955
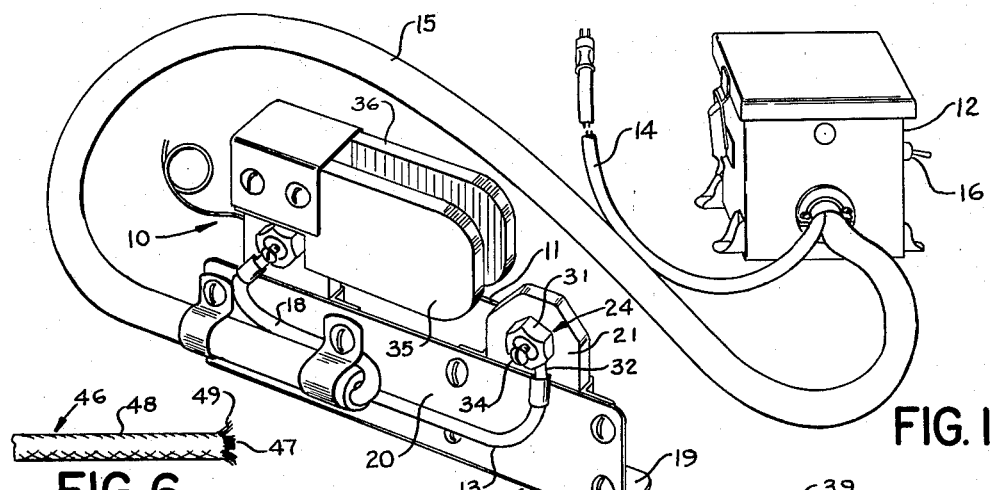
FIG. 1
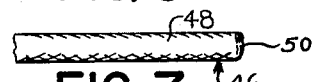
FIG. 6
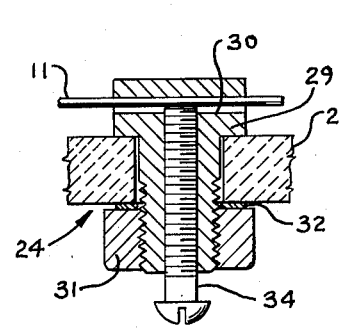
FIG. 7
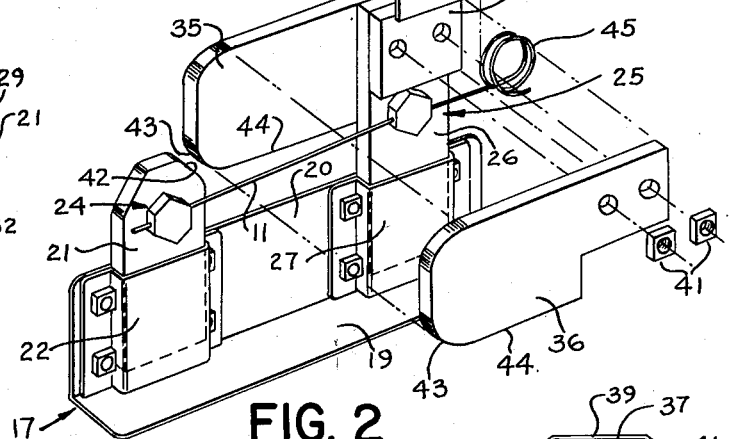
FIG. 4
FIG. 2
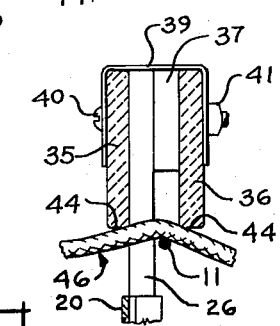
FIG. 5
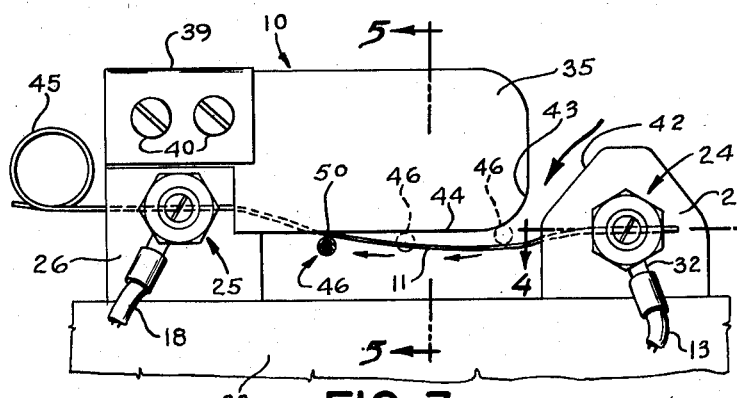
FIG. 3
INVENTOR
JOSEPH A. ANDERLE
BY
*Ramsay Chisholm & Hilder*
HIS ATTORNEYS

United States Patent Office 2,732,881
Patented Jan. 31, 1956

2,732,881

HOT WIRE CUTTER

Joseph A. Anderle, Westerleigh, N. Y., assignor to Lorentzen Hardware Mf'g. Corp., New York, N. Y., a corporation of New York Application March 18, 1955, Serial No. 495,118

11 Claims. (Cl. 154—1)

This invention relates to an apparatus for and a method of severing or "cutting" cord and simultaneously sealing the cut ends to obviate fraying. The invention is particularly applicable to cords in which at least some of the strands are composed of fusible plastic material.

The apparatus and method of the invention have been successfully used in the severing of cords having an exterior sheath of interlaced strands composed of fusible plastic material. These strands have little or no adhesive qualities and, when such a cord is cut or sheared in the usual manner, the plastic strands readily unravel or fray out at the cut ends.

The lift and tilt cords for Venetian blinds are examples of cords advantageously cut by the apparatus of the invention. Many of these cords have a central core composed of a plurality of longitudinally-extending rayon strands. Braided about the core is a sheath composed of flat yarns of fusible plastic material such as nylon. The individual filaments in the nylon yarns, and the yarns themselves, have little or no affinity for each other and are retained in place only by virtue of the braiding of the yarns in a continuous length of cord. When the cord is cut by a shearing instrument, the nylon yarns and the individual filaments thereof readily fray or bush out at the cut ends. This fraying becomes progressively more pronounced as the ends are threaded through the various fittings in the head bar, through the slats, and into the bottom bar. Not only does the fraying interfere with the threading of the cord but it often necessitates a second cutting operation after the cord has been threaded, to remove the frayed end portion.

Among the objects of the invention are the provision of apparatus for rapidly and conveniently cutting cord and producing adhesion between strands of fusible plastic material which may be included in the cord, and the provision of cord-cutting apparatus for severing cord including strands of fusible plastic material by locally melting and fusing together the strands of fusible plastic material in such cord and by locally burning through any other strands in the cord.

Further objects of the invention reside in the provision of a method of severing cords which include fusible plastic strands and simultaneously sealing the cut ends to obviate fraying.

Further objects of the invention including economies of manufacture and use will more fully appear in the detailed description to follow.

My invention is clearly defined in the appended claims. In the claims, as well as in the description, parts may at times be identified by specific names for clarity and convenience, but such nomenclature is to be understood as having the broadest meaning consistent with the context and with the concept of my invention as distinguished from the pertinent prior art. The best form in which I have contemplated applying my invention is illustrated in the accompanying drawings forming part of this specification, in which:

Fig. 1 is an isometric view of a cord cutter made in accordance with the invention and the power supply therefor.

Fig. 2 is an exploded isometric view of the cord cutter of Fig. 1, viewed from the side opposite to that of Fig. 1.

Fig. 3 is a side elevation of the cutter showing successive positions of the cord being severed by the cutter, and also showing the cut end of a cord that has been severed by the cutter.

Fig. 4 is a horizontal section through the forward cutting wire terminal of the cutter, the section being taken generally along the line 4—4 of Fig. 3.

Fig. 5 is a vertical section through the cutter, the section being taken generally along the line 5—5 of Fig. 3.

Fig. 6 is a fragmentary elevation of a nylon-sheathed cord having an end cut by scissors.

Fig. 7 is a fragmentary elevation of a similar cord having an end severed by the cutter of the invention.

The cutter of the invention, designated generally by the character 10, has a generally straight heated resistance wire 11 which progressively severs the cord as the cord is moved along the wire. Wire 11 is supplied with heating current through a cable 15 that is connected to the secondary winding of a step-down transformer 12, the primary winding of which is fed by cable 14 that is adapted to be connected to a suitable electric source (not shown). A switch 16 on the transformer is interposed in the primary circuit and allows the wire 11 to be energized or de-energized as desired.

The cutter 10 has a longitudinally extending L-shaped frame 17 having a base flange 19 which may be attached to a support such as a table (not shown). Vertical flange 20 of member 17 serves as a support for the forward refractory electrically insulating terminal support 21, which may be made, for example, of "Transite." Support 21 is secured to flange 20 by U-shaped clip 22, that is bolted to flange 20 and which clampingly receives the lower end of support 21. Wire 11 extends in a generally straight line from the forward terminal 24 to the rear terminal 25, which is carried by rear terminal support 26. Support 26 is held secured to flange 20 of member 17 by U-shaped clip 27 that is bolted to such flange and which clampingly receives the lower end of the support 26. Terminal support 26, which is also refractory and electrically insulating, also serves as the support for the two parallel cord-guiding members 35 and 36, which will be described later.

The construction of terminals 24 and 25, which are similar, will be apparent from a consideration of Fig. 4. As there shown, terminal 24 is composed of a headed stud 29 which passes through a hole in support 21 and is retained thereon by a nut 31. The flat attaching portion of a connector lug 32, attached to one wire 13 of the supply cable 15, is clamped beneath the nut. The forward end of cutting wire 11 passes through a diametral hole 30 in the head of stud 29, and is clamped therein by a screw 34 which is threaded into a central bore in the shank of stud 29. The rear end of wire 11 is similarly attached to the terminal 25, to which the other wire 18 of cable 15 is connected.

Above terminal 25 support 26 is provided with the two forwardly extending parallel guide members 35 and 36 lying one on each side of wire 11. Guide members 35 and 36 are preferably made of the same refractory, electrically insulating material as supports 21 and 26. As shown in Figs. 2 and 5 the rear end of guide member 35 lies against a side face of support 26, while between the rear end of guide member 36 and support 26 there is positioned a spacer member 37. A U-shaped clip 39 overlies the rear ends of members 35 and 36 and the top of support 26, the parts being held together by bolts 40 that pass through aligned openings in the assembled members, such bolts having the nuts 41 thereon. The bolt-receiving openings through members 35, 26, 37, and 36 are made somewhat larger than the diameter of bolts 40, so that upon loosening the bolts, members 35 and 36 may be adjusted somewhat as to the angle which the bottom edges 44 of each of members 35 and 36 make with the horizontal, and thus with the general extent of the wire 11.

In the cutter the rear terminal 25 lies somewhat above the forward terminal 24. The heights of the terminals 24 and 25 above flange 19 may be adjusted somewhat by loosening the bolts attaching the respective clips 22 and 27 to the flange 20 and then raising or lowering supports 21 and 26 as desired, after which the clip-retaining bolts are tightened. When the wire 11 is heated it expands and tends to sag somewhat from the straight condition shown in Fig. 2 into the shallow catenary-like shape shown in Fig. 3. The sag, however, is relatively slight, so that the heated wire lies in generally a straight line. The heated wire 11 lies substantially below the bottom edges 44 of members 35 and 36 at their forward free ends and rises from such level to pass at a small or shallow angle through the plane of edges 44 at a position spaced from the free ends of the guide members and forwardly of the support 26, as is shown in Fig. 3.

Preferably, the wire 11 extends through the terminal 25 into a reverse coil 45, so that a fresh section of wire is immediately available should the one in use break or burn out. If the wire 11 should sag objectionably during use, power to the wire may be shut off, one of the terminals 24, 25 be loosened, and the wire pulled taut and again clamped in the terminal.

Figs. 3 and 5 diagrammatically illustrate the operation of severing or "cutting" a cord by the cutter 10. The cord is preferably held in the operator's two hands with one hand on each side of the point at which the cut is to be made and is then introduced in a position transverse to wire 11. The downwardly slanting rear upper surface 42 of forward terminal support 21 and the lower corners of rounded forward free ends 43, 43 of guide members 35 and 36 form a cord-receiving channel between them designated by the curved arrow in Fig. 3. Upon entry of the cord 46 into the channel and into contact with cutting wire 11 and beneath guiding edges 44 of members 35 and 36, a shallow bight is formed in the cord when it is tensioned between the operator's hands, the wire 11 lying within the mid-point of the bight. The members 35 and 36, in addition to guiding the cord during the "cutting" operation, act as screens or shields which protect the operator from inadvertent contact with the hot wire 11.

The illustrative cord 46, as shown in Figs. 6 and 7, has a core 47 made up of a plurality of longitudinally-extending strands of rayon untwisted on each other, the cord having an external sheath 48 made up of flat, multifilament, braided nylon yarns, indicated at 48 in Fig. 6. When such cord is cut by an ordinary severing tool such as a knife or shear, the cut ends of the nylon yarn immediately tend to fray out as indicated at 49.

When the cord is severed by the method of the present invention, the fusible strands of the sheath 48 of cord 46 are progressively melted and sealed together at the cut ends as the cord is traversed along the wire. Two successive positions of the cord during such traverse are shown in dotted lines in Fig. 3. In the solid line position of the cord, shown at the left in Fig. 3, the cord has been cut completely through. During such traversing of the hot wire, the cord is accurately guided by the edges 44 of the guiding members, so that the cut ends of the cord lie generally perpendicular to the extent of the cord. The wire 11 locally fuses the plastic sheath at the cutting point and locally burns the combustible strands of the core. As a result of the relative movement between the cord and the wire 11, the fused plastic material of the sheath is smeared over the cut ends of the cord and seals the same. Rather hard unitary ends are formed, one of which is shown at 50, in which a predominant number of the plastic filaments are adhered to each other and/or to the burned ends of the combustible core strands.

Because of the small size of the wire and its relatively low specific heat, the cord quickly cools the wire at the point of contact. However, the sliding movement of the cord along the wire advances the cord to successive uncooled portions of the wire and thereby greatly increases the speed with which the "cut" can be effected. The movement of the cord with respect to the cutting wire also has the result of distributing wear on the cutting wire, thus reducing the tendency of the wire to burn through at any one spot along the operative length of the wire.

It has been found that the severed ends 50 of a cord such as 46 produced by the cutting method and apparatus of the invention successfully withstand many rough manipulations, such as successive threading operations, without starting to ravel. Further, the severed ends 50 are of substantially the same diameter as the cord itself. An end 50 of the cord may thus readily be threaded through cord-receiving openings in various members, and no further cutting or trimming operation on the end of the cord is necessary to prepare it for receiving a terminal fitting.

I claim:

1. A hot wire cord cutter comprising: a generally straight resistance wire extending between terminal supports, and a pair of spaced parallel guide members lying one on each side of the wire along a part of the length thereof, one end of the wire lying substantially below the plane of the lower edges of the members and the other end of the wire lying substantially above the lower edges of the members.

2. A hot wire cord cutter comprising: a generally straight resistance wire extending between terminal supports, and a pair of spaced parallel guide members having straight lower edges lying in the same horizontal plane and lying one on each side of the wire along a substantial part of the length thereof, one end of the wire lying substantially below the lower edges of the members at one end thereof and the other end of the wire lying substantially above the lower edges of the members.

3. A hot wire cord cutter comprising: a resistance wire extending in a generally straight line between terminal supports, and a pair of spaced parallel guide members lying one on each side of the wire along and generally parallel to the vertical plane containing the wire, the extent of the wire making a small angle with the length of the members, one end of the wire lying substantially below the lower edges of the members at one end thereof and the other end of the wire lying substantially above the lower edges of the members.

4. A hot wire cord cutter comprising: a pair of horizontal spaced parallel guide members supported at a first end of each, the other end of each of the members being free, a resistance wire extending generally in a straight line between terminal supports and lengthwise of and between the guide members, the extent of the wire making a small angle with the length of the members, the wire lying below the lower edges of the members at the free ends of the members and rising therefrom to lie above the lower edges of the members at and beyond a location substantially spaced from the free ends of the members.

5. A hot wire cord cutter comprising: a pair of horizontal spaced parallel guide members supported at a first end of each, the other end of each of the members being free and having their lower corners rounded, a resistance wire extending in a generally straight line between terminal supports and lengthwise of and between the guide members, one terminal support being located outwardly of and transversely between the free ends of the members, the wire lying at a small angle with respect to the lower edges of the members and lying below such edges at the free ends of the members and above such edges at and beyond a location spaced from the free ends of the members.

6. A hot wire cord cutter comprising: a pair of horizontal spaced parallel guide members supported at a first end of each, the other end of each of the members being free and having their lower corners rounded, a resistance wire extending in a generally straight line between terminal supports and lengthwise of and between the guide members, one terminal support being located outwardly of and transversely between the free ends of the members, the surface of said terminal support generally slanting downwardly toward the wire and forming with the rounded lower corners of the free ends of the members a cord-receiving channel, the wire lying at a small angle with respect to the lower edges of the members and lying below such edges at the free ends of the members and above such edges at and beyond a location spaced from the free ends of the members.

7. The method of cutting cord which includes a combustible core and a sheath composed of strands made of fusible plastic material, which comprises: positioning the cord transversely to and in contact with an elongated thin member heated above the fusing point of the plastic material, and urging the cord and member relatively toward each other to sever the cord by burning the core and fusing together the ends of the plastic strands at the severed ends of the cord.

8. The method of cutting cord having an exterior made of interlaced strands composed of fusible plastic material, which comprises: positioning the cord transversely to and in contact with an elongated wire heated above the fusing point of the plastic material, urging the cord and wire relatively toward each other, and traversing the cord along the wire progressively to sever the cord and to fuse together the ends of the plastic strands at the severed ends of the cord.

9. The method of cutting cord having an exterior made of interlaced strands composed of fusible plastic material, which comprises: forming a bight in the cord, positioning the cord transversely to and in contact with an elongated wire heated above the fusing point of the plastic material with the wire at the inside of the bight, urging the cord against the wire by imposing a force on the cord transversely thereof on each side of the wire by parallel fixed guides, one on each side of the wire, the plane of the guides insecting the wire at a small angle, and traversing the cord relative to the wire and the guides progressively to sever the cord and to fuse together the ends of the plastic strands at the severed ends of the cord.

10. In the method set forth in claim 8, the cord having a braided nylon sheath and a combustible core, the heated wire burning the core during the severing of the cord.

11. In the method set forth in claim 9, the cord having a braided nylon sheath and the core being composed of rayon strands, the heated wire burning the core during the severing of the cord.

References Cited in the file of this patent

UNITED STATES PATENTS

| | | |
|---|---|---|
| 2,551,811 | Mueller | May 8, 1951 |
| 2,627,213 | Nye | Feb. 3, 1953 |
| 2,646,494 | Gegan | July 21, 1953 |